July 8, 1952 M. T. BAGLEY 2,602,864

INPUT LOADING COMPENSATION FOR VACUUM TUBE AMPLIFIERS

Filed April 20, 1950

INVENTOR.
MICHAEL T. BAGLEY
BY
Allan V. Hazeltine
ATTORNEY

Patented July 8, 1952

2,602,864

UNITED STATES PATENT OFFICE 2,602,864

INPUT LOADING COMPENSATION FOR VACUUM TUBE AMPLIFIERS

Michael T. Bagley, Philadelphia, Pa., assignor to Philco Corporation, Philadelphia, Pa., a corporation of Pennsylvania Application April 20, 1950, Serial No. 157,060

2 Claims. (Cl. 179—171)

Figure 1:
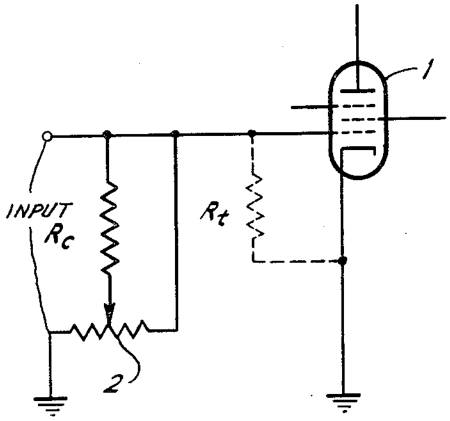

The invention herein described and claimed relates to wide-band, high frequency amplifiers. While not limited in its application, it is of particular utility in connection with intermediate frequency amplifiers for use in television receiving apparatus and especially in connection with such amplifiers operating at frequencies of the order of 40 megacycles.

A conventional intermediate frequency amplifier ordinarily comprises a plurality of cascaded vacuum tube stages, the output of a given stage being coupled to the input of the next succeeding stage by means of a passive electrical network which may comprise one or more tuned circuits. To secure the desired frequency response of this coupling network over a band of frequencies, it is customary to damp the resonance or resonances of the coupling network. At frequencies of the order of those customarily employed for intermediate frequency purposes in television receivers, the input resistance of a vacuum tube of the type normally employed in intermediate frequency amplifiers may be relatively low due to transit time effects, and hence the input resistance of such a tube may be used to provide all, or a substantial fraction, of the damping of the network coupling the input of said tube to the output of a preceding amplifier tube. Thus, for example, at 40 megacycles, the input resistance of a conventional type 6CB6 tube is in the neighborhood of 13,000 ohms, which is sufficiently low to provide a large part of the damping required for certain of the intermediate frequency coupling networks commonly employed.

At such frequencies, however, the tube input resistance is subject to considerable variation in response to variations in the mutual conductance ($g_m$) of the tube. In intermediate frequency amplifiers, the amplifier tubes will generally be subject to variation in their mutual conductances, due to variations in their biases either inadvertently or as a result of automatic control of the gain of the amplifier stages in response to variations in the strengths of incoming signals. Such variations in the mutual conductances of the tubes will therefore produce variations in their input resistances which, in turn, will vary the amount of damping of the interstage coupling networks. This will cause the frequency response characteristics of the amplifier to vary in a manner which will generally be highly undesirable.

Various expedients have heretofore been adopted with a view to mitigating this difficulty, but none of them have proved altogether satisfactory. Thus, in one arrangement, a relatively small coupling condenser is used between the interstage coupling network and the grid of the following tube. While this has the effect of tapping the grid down on the tuned coupling network and of reducing the magnitude of the over-all variation in damping thereof, it also results in a very severe and undesirable loss in gain of the amplifier. Another expedient involves the inclusion of a small inductance in the cathode lead of the tube between the point of connection of the grid return and ground, and the connection of a capacitor between the grid of the tube and its cathode. This method is likewise not fully satisfactory since it tends to produce instability of the amplifier and involves critical adjustments which are difficult to make in practice.

Accordingly it is a primary object of the present invention to provide simple, effective and non-critical means for compensating for variations in the input resistances of amplifier tubes operated at high frequencies and for maintaining the effective input resistances of such tubes substantially constant despite variations in the mutual conductances thereof.

Another object of the invention is to provide a wide-band, high frequency vacuum tube amplifier, comprising a plurality of vacuum tube stages interconnected by resonant coupling network, whose frequency response characteristic is not caused to vary appreciably by reason of variations in the input resistances of the tubes comprising the amplifier.

A further object of the invention is to provide means for simultaneously compensating for variations in both the resistive and capacitive components of the input impedances of high frequency amplifier tubes.

Briefly, these objectives are achieved in accordance with the invention by providing a resistor having one of its terminals connected to the grid of the amplifier tube, by the provision of means for developing a potential which varies in response to variations in the mutual conductance of the tube, and by applying the potential thus developed to the other terminal of the resistor. By the employment of these means, there is produced a variation in the input resistance of the tube additional to that due to transit time effects, and which is of such a nature that it tends to compensate for the latter variations. By appropriate selection of the value of the resistor and of the magnitude of the varying potential, it is possible to effect substantially complete compensation for the variations in the input resistance due to transit time effects so as to maintain the over-all input resistance substantially constant. In a preferred embodiment of the invention, the potential which varies in response to variations in the mutual conductance of the tube is developed across a resistor of suitable magnitude included in the cathode circuit of the amplifier tube, the other terminal of the compensating resistor being connected to the high potential terminal of the latter resistor. Also, in accordance with the invention, the magnitude of the cathode resistor, just referred to, may be selected so that it performs the additional function of compensating for variations in the input capacity of the tube in a manner which is well known in the art.

Figure 2:
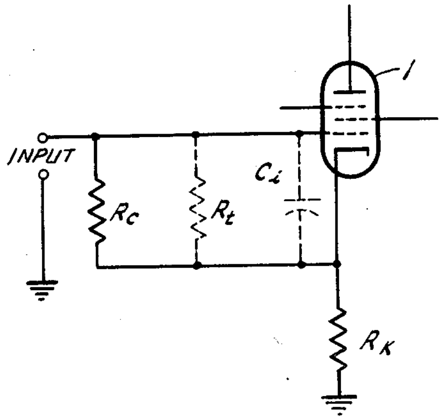
Figure 3:
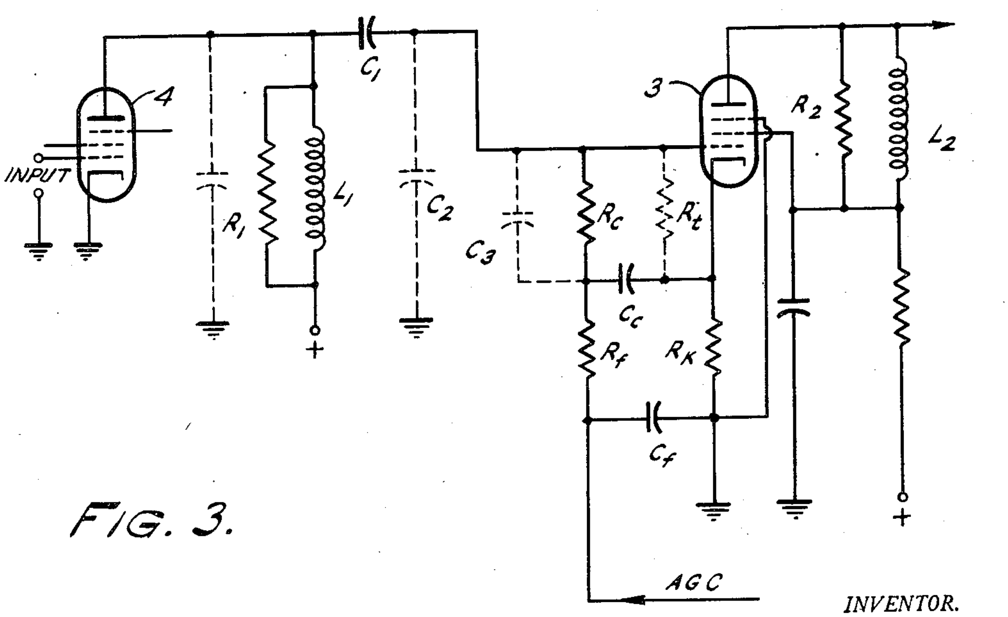

The invention will be fully understood from a consideration of the following detailed description with reference to the accompanying drawings in which Figures 1 and 2 are explanatory diagrams which will be referred to in setting forth the principles of the invention, and Fig. 3 is a schematic diagram illustrating a typical embodiment of the invention.

With reference now to Fig. 1, there is represented a pentode vacuum tube 1 whose input impedance, measured between its control grid and cathode at frequencies of the order of those employed for intermediate frequency amplification in television receivers, will exhibit a substantial resistive component as represented by the imaginary resistor $R_t$ connected between the grid and the cathode of the tube. As hereinbefore indicated, this resistive component of input impedance is due to so-called transit time effects, which are well understood by those skilled in the art and need not be discussed in detail here. Further, as hereinbefore mentioned, this resistive component of input impedance will be subject to considerable variation in response to variations in the grid bias of the tube which produce corresponding variations in its mutual conductance. More particularly, when the mutual conductance of the tube decreases in response to an increase in the negative bias applied to the grid of the tube, the magnitude of the resistive component of input impedance will increase. Apparently it would be possible to compensate for this variation in input resistance by providing a variable resistor connected between the grid of the tube and ground and by controlling this resistor in response to variations in the mutual conductance of the tube so as to cause its magnitude to increase in response to increases in the mutual conductance of the tube and to decrease in response to decreases of said mutual conductance. Such variation might be controlled in such a manner as to maintain the over-all inout resistance to the tube substantially constant. However, some practical difficulties might be encountered in providing such a controllable resistor.

A simpler way of accomplishing the same result is to provide a fixed resistor $R_c$, as shown in Fig. 1, one terminal of which is connected to the grid of the tube and the other terminal of which is connected to a source of a signal whose frequency is the same as that of the input signal supplied to the grid of the tube for amplification, but whose amplitude is caused to vary in response to variations in the mutual conductance of the tube. Thus, as shown in the figure, the lower terminal of resistor $R_c$ might be connected to a slider on a potentiometer 2 connected between the grid of tube 1 and ground. By varying the magnitude of the signal applied to the lower terminal of resistor $R_c$ in response to variations in the mutual conductance of the tube by movement of the slider, the effect of resistor $R_c$ on the input resistance of the tube may be caused to vary. More particularly, if the magnitude of the signal applied to the lower terminal of resistor $R_c$ is decreased as the mutual conductance of the tube decreases the effective resistance presented by the resistor $R_c$ will decrease and thereby tend to compensate for the increase in the resistive component of the input impedance of the tube due to transit time effects.

While a signal which varies in response to variations in the mutual conductance of the tube, and which decreases in response to decreases in said mutual conductance, may be produced in any desired manner, it may conveniently be developed across a resistor $R_k$ included in the connection from the cathode of the tube to ground, as shown in Fig. 2. It is readily demonstrable that, when the mutual conductance of the tube decreases in response to an increase in the negative bias applied to its grid, the magnitude of the signal developed across resistor $R_k$ will decrease. Hence, if the lower terminal of resistor $R_c$ be connected directly to the upper terminal of resistor $R_k$, as shown in Fig. 2, the desired variation in the potential of the lower terminal of resistor $R_c$ will be produced in response to variations in the mutual conductance of the tube to effect compensation for variations in the magnitude of the input resistance $R_t$ of the tube due to transit time effects. More particularly the values of $R_c$ and $R_k$ may be selected so as to effect substantially complete compensation for such variations. It is known that the relationship, between the input resistance of the tube due to transit time effects and the mutual conductance of the tube, is generally one of substantially inverse proportionality as given by the expression:

$$R_t=\frac{1}{K_1 g_m}$$

where $K_1$ is a constant. This being so, it can be demonstrated that the desired compensation for variations in the input resistance due to transit time effects will obtain if the relationship between $R_c$ and $R_k$ is substantially as given by the expression: $K_1R_c=R_k$. This can be demonstrated theoretically, and experimental results are consistent with the theory.

Now it is further to be noted that, in general, at high frequencies, the input impedance of an amplifier tube will exhibit a capacitive component as represented by the imaginary condenser $C_t$ connected between the grid and cathode of tube 1 in Fig 2. Like the resistive component of input impedance, this capacitive component will also be subject to variations in response to variations of the mutual conductance of the tube. Such variations may likewise be undesirable in that, for example, in an intermediate frequency amplifier, they will tend to alter the tuning of the intermediate frequency coupling circuits between the stages. It is known that these variations in input capacity may be compensated for by including, in the connection from the cathode of the tube to ground, a resistor of appropriate magnitude. Usually the relationship between the capacitive component of input impedance and the mutual conductance of the tube will be one of substantially direct proportionality as given by the expression: $C_t=C_0+K_2g_m$, in which $C_0$ is the input capacity of the tube when the mutual conductance $g_m$ is zero, and $K_2$ is a constant. Under such circumstances it is known that the magnitude of the cathode resistor $R_k$ should be made equal to $K_2/C_0$ in order to effect the desired compensation for variations in input capacity. It will be apparent that the selection of the magnitude of the cathode resistor in this manner is in no way inconsistent with maintaining the desired relationship between $R_c$ and $R_k$ in accordance with the principles of the present invention to effect compensation for variations in input resistance. Thus it will be seen that the value of $R_c$ may still be made equal to $R_k/K_1$ to satisfy these requirements. In the arrangement shown, in which the lower terminal of resistor $R_c$ is connected to the upper terminal of resistor $R_k$, the value of $R_c$ will then be equal to $K_2/K_1C_0$. However it will be noted that, alternatively, the lower terminal of resistor $R_c$ may be connected to a tap intermediate the two terminals of resistor $R_k$. This will permit the selection of a different value of resistor $R_c$, as determined by the magnitude of that portion of resistor $R_k$ between the tap and ground, while permitting the total magnitude of the resistance in the cathode circuit of the tube to be that required for the compensation of input capacity variation.

Reference is now made to Fig. 3 which shows a portion of an intermediate frequency amplifier intended for operation at a frequency of 40 megacycles and embodying the present invention. In this arrangement coupling from the output of an amplifier tube 4 to the input of a subsequent amplifier tube 3 is effected by means of a network comprising an inductor $L_1$ in the plate lead of tube 2, which inductor is chosen so as to resonate with the output capacity of tube 2 and the input capacity of tube 3 at a frequency having a predetermined relationship to the band of intermediate frequencies to be amplified. Loading of this circuit, in addition to that which is provided by the input resistance of tube 3, may be provided by a resistor $R_1$ connected in shunt with inductor $L_1$. Coupling from the high potential terminal of inductor $L_1$ to the grid of tube 3 is effected via coupling condenser $C_1$. The inherent capacity between the grid and cathode of tube 3 is represented by condenser $C_3$, while that between the grid and other elements, such as the screen, shield, tube socket etc., is represented by the condenser $C_2$. The resistive component of input impedance of the tube due to transit time effects is represented by the resistor $R_t$. As in the explanatory diagram of Fig. 2, the resistor $R_c$ is included to effect compensation for variations in the magnitude of $R_t$, while the resistor $R_k$, connected between the cathode of the tube and ground, performs the double function of compensating for variations in input capacity and of developing a potential which varies in response to variations in the mutual conductance of the tube, which variations are applied to the lower terminal of resistor $R_c$. In the arrangement as shown, agc control voltage from a source (not shown) is supplied through a filter network comprising resistor $R_f$ and condenser $C_f$ to the grid of tube 3 to vary its grid bias and thereby its mutual conductance. It is therefore necessary to include a by-pass condenser $C_c$ between the lower terminal of resistor $R_c$ and the upper terminal of resistor $R_k$ to prevent short-circuiting of the agc control voltage. Apparently this condenser should be of low impedance at the intermediate frequency.

In an actual embodiment of the invention constructed according to Fig. 3, the values of $R_c$ and $R_k$ were selected in accordance with the principles hereinbefore set forth. Their values and those of the various other circuit elements employed in this embodiment, so far as they are pertinent to the present invention, are as follows:

| | |
|---|---|
| $R_c$ | 13,000 ohms |
| $R_k$ | 47 ohms |
| $R_f$ | 470 ohms |
| $C_c$ | 1000 micromicrofarads |
| $C_1$ | 100 micromicrofarads |
| $C_2$ | 3 micromicrofarads |
| $C_3$ | 2 micromicrofarads |
| Tube 3 | Type 6CB6 |

It is to be understood, of course, that the values above set forth are exemplary only and not intended to limit the scope of the invention as defined by the appended claims.

I claim:

1. In a high frequency vacuum tube amplifier, a stage comprising a vacuum tube having at least triode elements, said tube being subject to variations in its mutual conductance $g_m$ and said stage having an input resistance $R_t$ due to transit time effects in said tube which varies in response to variations in said mutual conductance in substantial accordance with the expression:

$$R_t = \frac{1}{K_1 g_m}$$

a resistor having one of its terminals connected to the grid of said vacuum tube, a second resistor included serially in the cathode circuit of said vacuum tube for developing thereacross a potential which varies in response to variations in the mutual conductance of said tube, the values of said resistors being inter-related in substantial accordance with the expression: $K_1R_c=R_k$, where $R_c$ is the value of said first resistor and $R_k$ is the value of said second resistor, and a connection from the other terminal of said first resistor to the high potential terminal of said second resistor for applying said developed potential to said other terminal of said first resistor to effect variations in the input resistance of said stage tending to compensate the variations due to transit time effects.

2. In a high frequency vacuum tube amplifier, a stage comprising a vacuum tube having at least triode elements, said tube being subject to variations in its mutual conductance $g_m$, said stage having an input resistance $R_t$ due to transit time effects in said tube which varies in response to variations in said mutual conductance in substantial accordance with the expression:

$$R_t = \frac{1}{K_1 g_m}$$

and said stage having an input capacity which varies in substantial accordance with the expression: $C_t=C_0+K_2g_m$, a resistor having one of its terminals connected to the grid of said vacuum tube, a second resistor included serially in the cathode circuit of said tube for developing thereacross a potential which varies in response to variations in the mutual conductance of said tube, the values of said resistors being inter-related in substantial accordance with the expression: $K_1R_c=R_k$, where $R_c$ is the value of said first resistor and $R_k$ is the value of said second resistor, and the value of $R_k$ being substantially as given by the expression:

$$R_k = \frac{K_2}{C_0}$$

and a connection from the other terminal of said first resistor to the high potential terminal of said second resistor for applying said developed potential to said other terminal of said first resistor to effect variations in the input resistance of said stage tending to compensate the variations due to transit time effects.

MICHAEL T. BAGLEY.

REFERENCES CITED

The following references are of record in the file of this patent:

UNITED STATES PATENTS

| Number | Name | Date |
|---|---|---|
| 2,091,134 | Beers | Aug. 24, 1937 |
| 2,273,143 | Roberts | Feb. 17, 1942 |
| 2,435,331 | Street | Feb. 3, 1948 |

OTHER REFERENCES

Textbook, Principles of Radar, M. I. T. Radar School Staff, McGraw-Hill Book Co., 2nd edition 1946, first edition published 1944, Chapter VI, Article 11, Sect. 6–52 to 6–56, Figs. 29 and 30.